United States Patent
Ha

(10) Patent No.: US 6,741,308 B2
(45) Date of Patent: May 25, 2004

(54) TRANSFLECTIVE LIQUID CRYSTAL DISPLAY DEVICE

(75) Inventor: Kyoung-Su Ha, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 50 days.

(21) Appl. No.: 10/135,832

(22) Filed: May 1, 2002

(65) Prior Publication Data

US 2002/0196395 A1 Dec. 26, 2002

(30) Foreign Application Priority Data

Jun. 26, 2001 (KR) ................................. P2001-036500

(51) Int. Cl.$^7$ ............................................. G02F 1/1335
(52) U.S. Cl. ................................... 349/114; 349/106
(58) Field of Search ....................... 349/113–114, 106

(56) References Cited

U.S. PATENT DOCUMENTS 6,281,952 B1 * 8/2001 Okamoto et al. ............. 349/12
6,522,377 B2 * 2/2003 Kim et al. .................... 349/114

* cited by examiner

Primary Examiner—Dung Nguyen
(74) Attorney, Agent, or Firm—Morgan Lewis & Bockius LLP

(57) ABSTRACT

A transflective liquid crystal display device includes first and second substrates facing into each other, a pixel electrode on an inner surface of the second substrate, the pixel electrode having a first borderline between the reflective and transmissive portions, a transflective color filter layer on an inner surface of the first substrate, the transflective color filter layer having a second borderline between the reflective and transmissive portions, the first and second borderlines being not aligned in a vertical direction and separated by a distance to be within an attachment error margin, and a transmittance of the transflective color filter layer at the reflective portion being higher than that of the transflective color filter layer at the transmissive portion, a common electrode on the transflective color filter layer, and a liquid crystal layer between the pixel electrode and the common electrode.

14 Claims, 7 Drawing Sheets

TRANSFLECTIVE LIQUID CRYSTAL DISPLAY DEVICE

This application claims the benefit of the Korean Patent Application No. P2001-36500 filed on Jun. 26, 2001, which is hereby incorporated by reference.

BACKGROUND OF THE INVENTION

1. Field of the Invention

The present invention relates to a liquid crystal display device, and more particularly, to a transflective liquid crystal display device.

2. Discussion of the Related Art

A liquid crystal display device has characteristics of light weight, thin thickness, and low power consumption. Thus, it has been highlighted as a next generational display device. Generally, an LCD device is a non-emissive display device displaying images by using a refractive index difference according to the optical anisotropy of the liquid crystal interposed between array and color filter substrates.

In the conventional LCD device, a displaying method using a backlight behind the array substrate as a light source is commonly used. However, the incident light from the backlight is attenuated during the transmission so that the actual transmittance is only about 7%. The backlight of the conventional LCD device requires high brightness, and thus power consumption by the backlight device increases. A relatively heavy battery is needed to supply a sufficient power to the backlight of such a device, and the battery cannot be used for a long period of time.

In order to overcome the problems described above, a reflective LCD has been developed. Since the reflective LCD device uses the ambient light instead of the backlight, it becomes light and easy to carry. In addition, power consumption of the reflective LCD device is reduced so that the reflective LCD device can be used for a portable display device such as an electric diary or a personal digital assistant (PDA).

However, brightness of the reflective LCD device may vary with the surroundings. For example, brightness of the indoor ambient light differs largely from that of the outdoors. Therefore, the reflective LCD device cannot be used where the ambient light is weak or does not exist. In order to overcome these problems, a transflective LCD device has been researched and developed. The transflective LCD device is switchable according to the user's selection from a transmissive mode using transmission of light to a reflective mode using reflection of light.

To increase a light efficiency between the transmissive and reflective modes, retardations ($\delta$) of liquid crystal layer of the transmissive and reflective modes should be equal. The retardation of the liquid crystal layer is defined by the following equation:

$$\delta = \Delta n \cdot d$$

wherein $\delta$ is a retardation of the liquid crystal layer, $\Delta n$ is a refractive index anisotropy of the liquid crystal layer, and d is a cell gap of the liquid crystal layer.

Therefore, the retardation of the liquid crystal layer in the transflective LCD device may be constant by forming a cell gap of the transmissive portion larger than that of the reflective portion.

FIG. 1 is a schematic cross-sectional view of a conventional transflective LCD device.

In FIG. 1, upper and lower substrates 10 and 30 are spaced apart from each other and a liquid crystal layer 20 is interposed therebetween. A backlight 38 is disposed at the outside of the lower substrate 30. On the inner surface of the upper substrate 10, a color filter layer 12 for passing only the light having a specific wavelength and a common electrode 14 functioning as one electrode for applying a voltage to the liquid crystal layer 20 are subsequently formed. On the inner surface of the lower substrate 30, a transparent pixel electrode 32 functioning as another electrode for applying a voltage to the liquid crystal layer 20, a passivation layer 34 having a transmissive hole 31 exposing a portion of the pixel electrode 32, and a reflective layer 36 are subsequently formed. The area corresponding to the reflective layer 36 is a reflective portion "r" and the area corresponding to the portion of the pixel electrode 32 exposed by the transmissive hole 31 is a transmissive portion "t".

A cell gap "$d_1$" at the transmissive portion "t" is about twice of a cell gap "$d_2$" at the reflective portion "r" to reduce a light path difference. However, even though the light efficiency of the liquid crystal layer between reflective and transmissive modes becomes equal by making the cell gap different, the number of light passing through the color filter layer at different portions is different. Thus, the brightness becomes different at the front of the display device.

Transmittance of the color filter resin having a high absorption coefficient only for a specific wavelength satisfies the following equation when Fresnel reflection is not considered and the transmittance is inversely proportional to the absorption coefficient and the distance that light passes:

$$T = exp(-\alpha \cdot d)$$

wherein T is transmittance, $\alpha$ is an absorption coefficient of the color filter layer and d is a distance that light passes in the color filter layer.

At the reflective portion "r", light passes the color filter layer 12 twice. Since the transmittance and the color purity are determined by an absorption coefficient and a thickness of the color filter layer according to the above equation, the values of $exp(-\alpha \cdot d)$ at the transmissive and reflective portions should be controlled to be equal to avoid differences of the transmittance between the transmissive and reflective portions. Therefore, the transmittance becomes constant at the transmissive and reflective portions by forming the color filter layer of the reflective portion thicker than that of the transmissive portion with the same absorption coefficient. For example, the color filter layer at the reflective portion is formed to be twice as thick as that at the transmissive portion. Alternatively, the absorption coefficient of the color filter layer at the reflective portion is formed to be lower than that at the transmissive portion.

Generally, color purity increases and transmittance decreases when a color filter layer becomes thicker. Therefore, the transmittance and the color purity of the transmissive and reflective portions are maintained by increasing the transmittance and decreasing the color purity of the reflective portion, or by increasing the color purity and decreasing the transmittance of the transmissive portion.

A color filter layer is classified into a dye type and a pigment type depending on the material of the organic filter. Depending upon the method of fabricating the color filter layer, it may also be divided into a dyeing method, a printing method, a pigment dispersion method, and an electro-deposition method. The pigment dispersion method is most widely employed.

FIG. 2A is a cross-sectional view of a conventional transflective LCD device having a color filter layer. Pigment concentrations at the transmissive and reflective portions of the color filter layer are different from each other. Since the structure of FIG. 2A is similar to that of FIG. 1, the explanation about the same structure will be omitted for convenience.

In FIG. 2A, reflective and transmissive color filters 40a and 40b are disposed at the reflective and transmissive portions "r" and "t", respectively. The transmittance of the reflective and transmissive color filters 40a and 40b becomes different from each other when the absorption coefficients of the reflective and transmissive color filters 40a and 40b are adjusted. For example, the pigment concentrations of the reflective and transmissive color filters 40a and 40b may be formed differently from each other. Since the pigment concentration of the color filter layer is proportional to the absorption coefficient of the color filter layer, the transmittance of the reflective color filter layer 40a can be higher than that of the transmissive color filter layer 40b by making the pigment concentration of the reflective color filter layer 40a lower than that of the transmissive color filter layer 40b.

FIG. 2B is a cross-sectional view of a conventional transflective LCD device having a color filter layer whose thicknesses at the transmissive and reflective portions are different from each other. Since the structure of FIG. 2B is similar to that of FIG. 1, the explanation about the same structure will be omitted for convenience. A color filter having two different thicknesses at the reflective and transmissive portions of the same color filter layer can be referred to as a dual thickness color filter (DCF) type.

In FIG. 2B, a transmissive color filter layer 42b is thicker than a reflective color filter layer 42a by forming a transparent buffer layer 44 on the inner surface of an upper substrate 1 at the reflective portion "r". Since the thicknesses of the reflective and transmissive color filter layers 42a and 42b are varied with the thickness of the buffer layer 44, a desired thickness ratio between the reflective and transmissive color filter layers 42a and 42b is obtained. Therefore, transmittance and color purity of the reflective and transmissive portions are adjusted by making the color purity of the transmissive color filter layer higher than that of the reflective color filter layer.

As shown in FIGS. 2A and 2B, a color filter layer of a transflective liquid crystal display device has different color purity at reflective and transmissive portions. The different color purity of the reflective and transmissive portions can be formed by using thickness difference of a color resin or by using concentration difference of a color resin. The color filter layer having the different color purity is referred to as a transflective color filter layer.

FIG. 3 is a schematic perspective view showing a transflective color filter layer of an upper substrate and a transflective portion of a lower substrate for a conventional transflective LCD device.

In FIG. 3, the upper and lower substrates are attached to each other without a misalignment. Generally, an attachment error margin is determined by the substrate design and should be within a range of a few micrometers. If the upper and lower substrates are attached with a misalignment greater than the error margin, a desirable driving characteristic may not be obtained due to a light leakage. Therefore, the attachment process should be performed to be within the error margin.

In FIG. 3, a transflective portion 46 of the lower substrate and a transflective color filter layer 48 of the upper substrate are spaced apart from each other. A lower transparent electrode 46b and a transmissive color filter layer 48b are disposed at the center of the transflective portion 46 and transflective color filter layer 48, respectively. A reflective layer 46a and a reflective color filter layer 48a surround the lower transparent electrode 46b and the transmissive color filter layer 48b, respectively. Therefore, in the conventional LCD device, the boundary of the transmissive and reflective color filter layers of the upper substrate should be aligned with the boundary of the transmissive and reflective portions of the lower substrate.

When there is no attachment error margin, the border of the transflective color filter layer 48 should be exactly aligned with the border of the transflective portion 46 of the lower'substrate. Thus, designed values of transmittance and color purity in the transmissive and reflective modes are different from the actual values when a misalignment occurs.

FIG. 4 is a schematic plane view showing ideal alignment and misalignment states for a conventional transflective LCD device.

In FIG. 4, a first borderline "A" shows the border of reflective and transmissive color filter layers 50a and 50b, and second and third borderlines "B" and "C" show the borders of reflective and transmissive portions of a lower substrate, which are moved from the first borderline "A" due to a misalignment. The misalignment of the third borderline "C" is greater than that of the second borderline "B". In the conventional LCD device having the structure of FIG. 4, since a color filter layer having different transmittance and color purity is included in the opposite color filter layer due to a misalignment during the attachment process, the transmittance increases and the color purity decreases at the transmissive portion, and the transmittance decreases and the color purity increases at the reflective portion. Therefore, the display quality is deteriorated.

SUMMARY OF THE INVENTION

Accordingly, the present invention is directed to a transflective liquid crystal display device that substantially obviates one or more of problems due to limitations and disadvantages of the related art.

Another object of the present invention is to provide a transflective liquid crystal display device having an improved display quality by maintaining transmittance and color purity to be a desired value even when a misalignment occurs.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a transflective liquid crystal display device includes first and second substrates facing into each other, a pixel electrode on an inner surface of the second substrate, the pixel electrode having a first borderline between the reflective and transmissive portions, a transflective color filter layer on an inner surface of the first substrate, the transflective color filter layer having a second borderline between the reflective and transmissive portions, the first and second borderlines being not aligned in a vertical direction and separated by a distance to be within an attachment error margin, a transmittance of the transflective color filter layer at the reflective portion being higher than that of the transflective color filter layer at the transmissive portion, a common electrode on the transflective color filter layer, and a liquid crystal layer between the pixel electrode and the common electrode.

In another aspect of the present invention, a transflective liquid crystal display device includes first and second substrates facing into each other, a pixel electrode on an inner surface of the second substrate, the pixel electrode having a first borderline between the reflective and transmissive portions, a transflective color filter layer on an inner surface of the first substrate, the transflective color filter layer having a plurality of light passing regions without filtering light between the reflective and transmissive portions, a common electrode on the transflective color filter layer, and a liquid crystal layer between the pixel electrode and the common electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1:
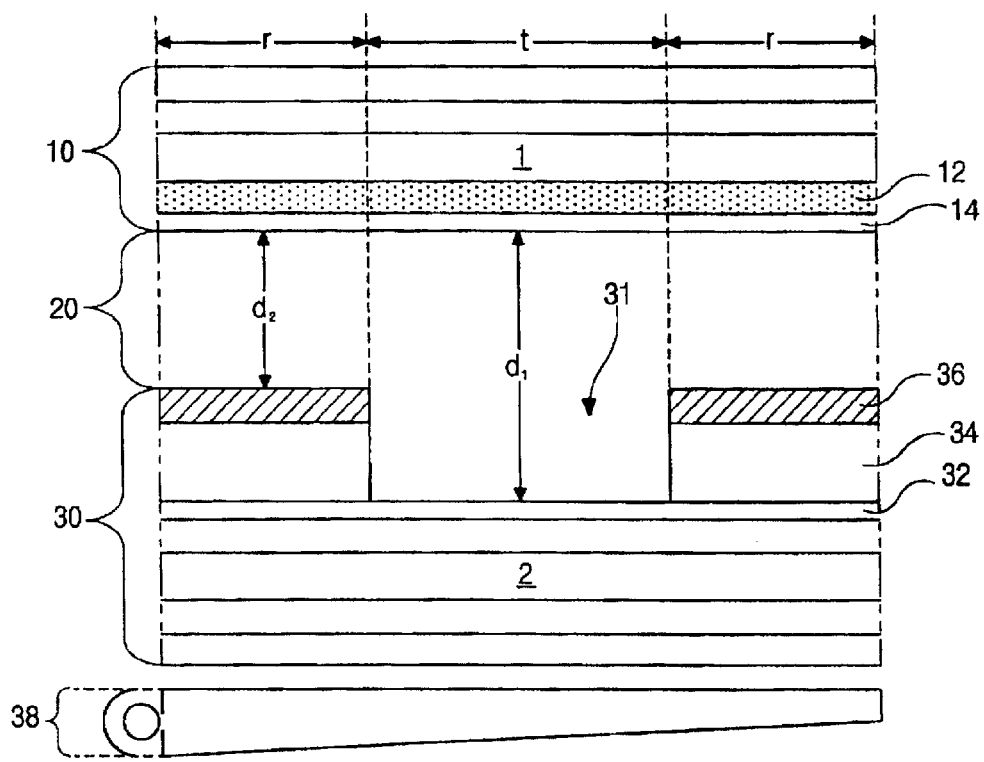
FIG. 1 is a schematic cross-sectional view of a conventional transflective LCD device.
Figure 2A:
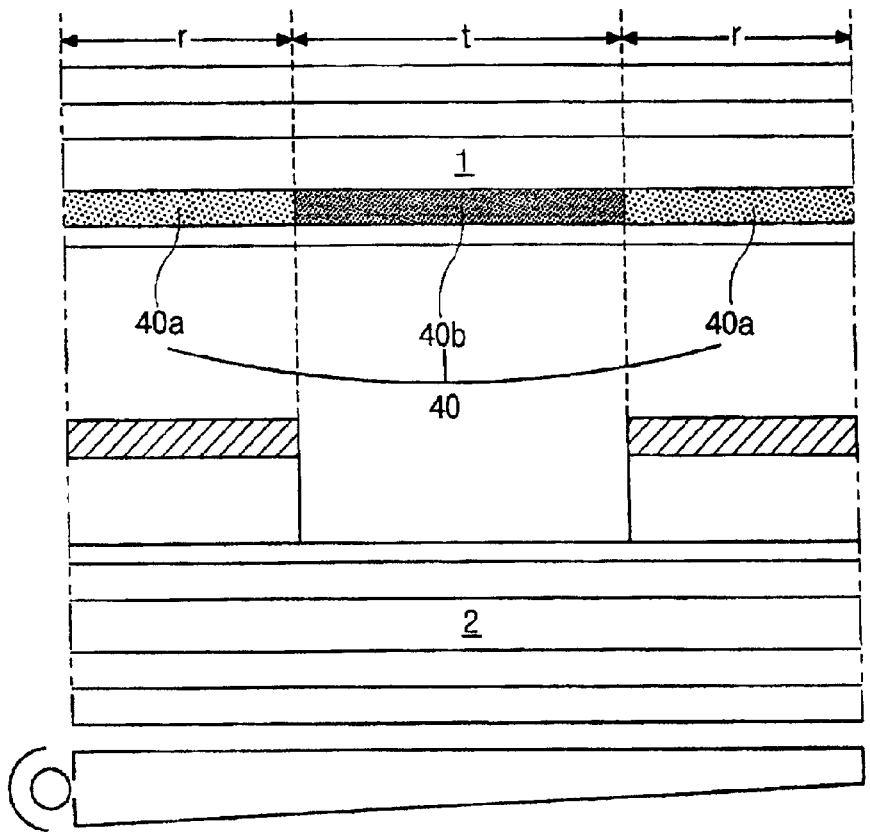
FIG. 2A is a cross-sectional view of a conventional transflective LCD device having a color filter layer whose pigment concentrations at the transmissive and reflective portions are different from each other.
Figure 2B:
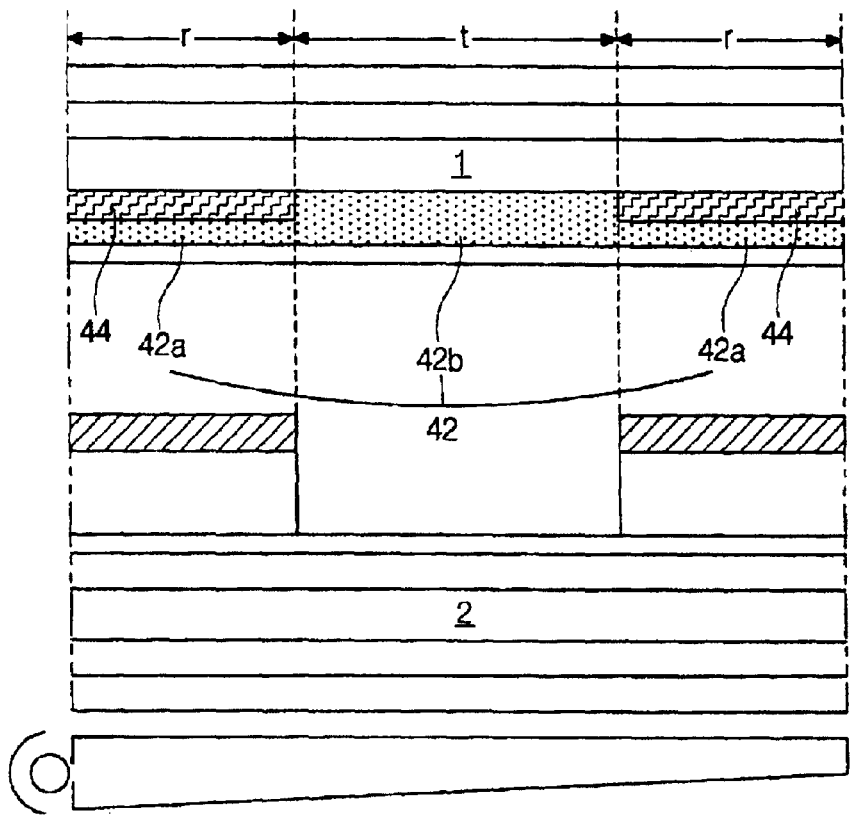
FIG. 2B is a cross-sectional view of a conventional transflective LCD device having a color filter layer whose thicknesses at the transmissive and reflective portions are different from each other.
Figure 3:
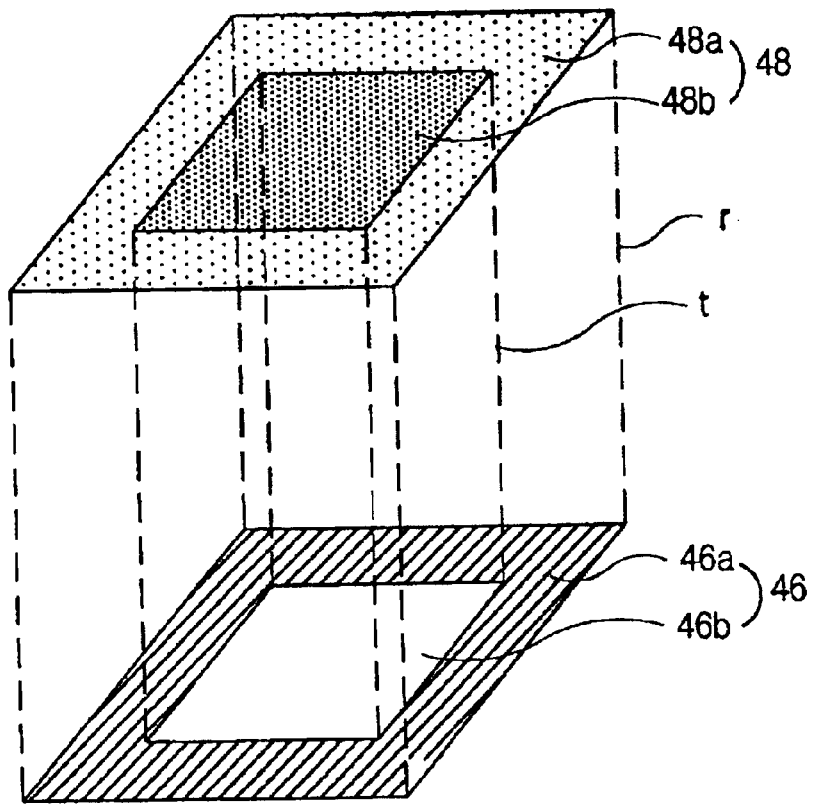
FIG. 3 is a schematic perspective view showing a transflective color filter layer of an upper substrate and a transflective portion of a lower substrate for a conventional transflective LCD device.
Figure 4:
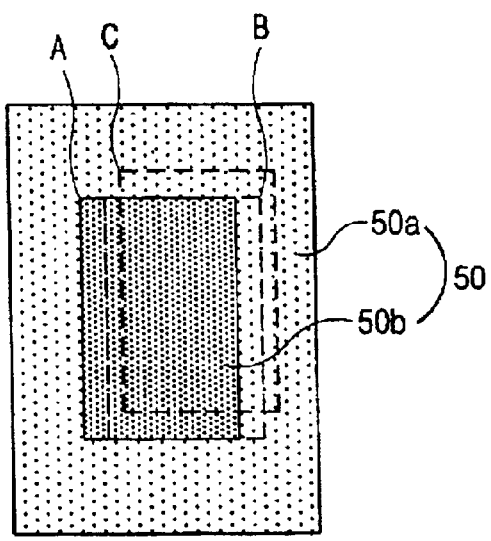
FIG. 4 is a schematic plane view illustrating alignment and misalignment states for a conventional transflective LCD device.
Figure 5:
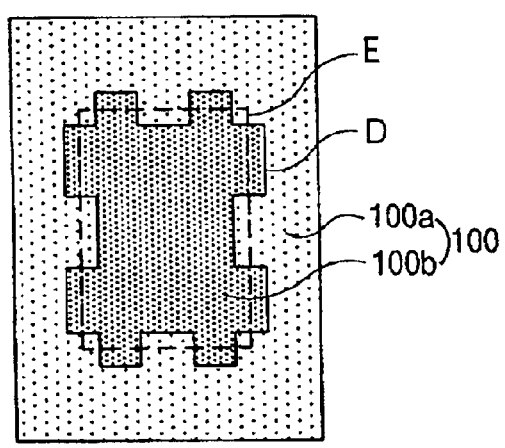
FIG. 5 is a schematic plane view showing a color filter layer of a transflective liquid crystal display device according to a first embodiment of the present invention.

FIG. 5 is a schematic plane view showing a color filter layer of a transflective liquid crystal display device according to a first embodiment of the present invention. The structure of FIG. 5 is similar that of FIGS. 2A and 2B except for the color filter layers.

In FIG. 5, a transmissive color filter layer 100b is formed at the center of a transflective color filter layer 100, and a reflective color filter layer 100a surrounds the transmissive color filter layer 100b. The dotted line "E" between the reflective and transmissive color filter layers 100a and 100b is aligned with the borderline between reflective and transmissive portions of a lower substrate when the upper and lower substrates are attached to each other without a misalignment. The borderline "D", which has a plurality of indented portions and at least one alternately protruded portion from the dotted line "E". Therefore, constant areas of the reflective and transmissive color filter layers 100a and 100b overlap the transmissive and reflective portions.

Although the protruded portion of the borderline "D" in the first embodiment is a shape of quadrangle, the protruded portion may be a shape of circle, triangle, or any polygonal shape. The protruded portion should be greater than the alignment error margin in the attachment process. However, a design error may be minimized when the protruded portion is smaller than the alignment error margin. For example, a distance between the dotted line "E" and the borderline "D" is within the range of 2 to 50 µm (micrometers).

Therefore, in the transflective color filter layer 100 according to the present invention, since the borderline "D" between the reflective and transmissive color filter layers 100a and 100b is formed to be within the alignment error margin, transmittance and color purity of the reflective and transmissive portions are kept constant as a desired value even when a misalignment occurs during the attachment process due to the misalignment is included in the range of the borderline "D".

The transflective color filter layer 100 is formed by one of a dyeing method, a printing method, a pigment dispersion method, and an electro-deposition method.

In the transflective color filter layer 100, to adjust transmittance and color purity of the reflective and transmissive color filter layers, the reflective color filter layer 100a should be formed to have higher transmittance and lower color purity than the transmissive color filter layer 10b. The transflective color filter layer having the above-mentioned characteristics is formed by making a pigment concentration of the transmissive color filter layer 100b higher than that of the reflective color filter layer 100a, or forming the transmissive color filter layer 100b thicker than that of the reflective color filter layer 100a.

In the method of making the pigment concentration of the transmissive color filter layer 100b higher than that of the reflective color filter layer 100a, the transmittance and the color purity of the reflective and transmissive portions are adjusted to a desired value. This is because the transmittance of the reflective color filter layer 100a is higher than that of the transmissive color filter layer 100b.

On the other hand, in the method of forming the transmissive color filter layer 100b thicker than that of the reflective color filter layer 100a, a transparent buffer layer is included. A buffer layer may be formed by depositing an additional transparent material. When a glass substrate is used, the substrate is etched to form a step at the border between the reflective and transmissive portions. Alternatively, when a plastic substrate is used, the substrate is pressed to form unevenness. A pattern of the buffer layer may be aligned with the indented portion of the borderline "D".

Figure 6:
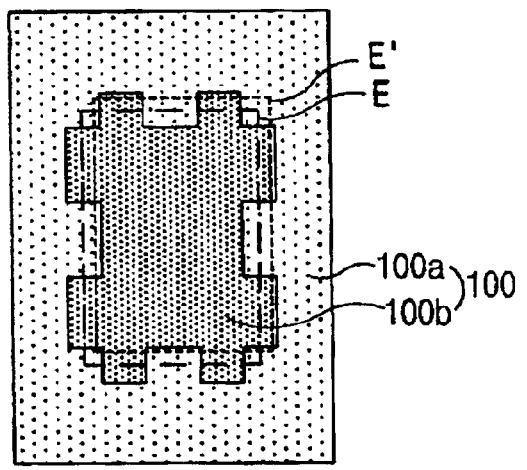
FIG. 6 is a schematic plane view of the color filter layer of the transflective liquid crystal display device according to the first embodiment of the present invention illustrating that an area ratio between reflective and transmissive portions is kept constant even when a misalignment occurs after an attachment process.

FIG. 6 is a schematic plane view of a color filter layer of a transflective LCD device according to the first embodiment of the present invention illustrating that an area ratio between reflective and transmissive portions is kept constant even when there is a misalignment after the attachment process.

In FIG. 6, if reflective and transmissive portions of a lower substrate moves right and upward from a transflective color filter layer 100 after the attachment process, a transflective mode is realized based on the misaligned borderline "E'". However, since area ratios between reflective and transmissive color filter layers 10a and 100b of an ideally aligned borderline "E" and the misaligned borderline "E'" are by kept constant, transmittance and color purity of the reflective and transmissive portions are maintained to be a desired value.

Figure 7:
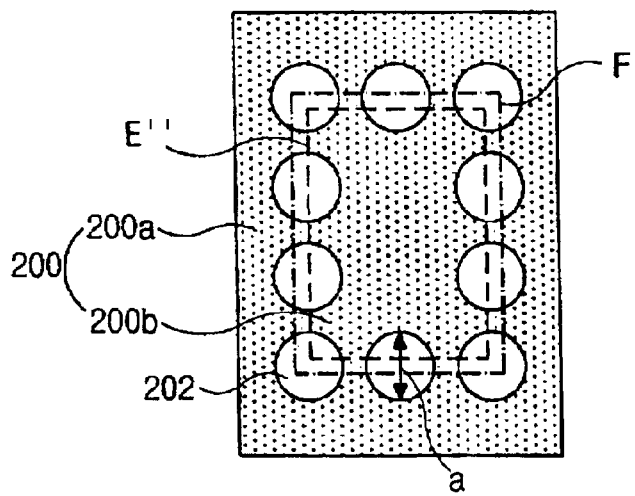
FIG. 7 is a schematic plane view of a color filter layer of a transflective liquid crystal display device according to a second embodiment of the present invention.

FIG. 7 is a schematic plane view of a transflective color filter layer according to a second embodiment of the present invention.

In the second embodiment of the present invention, a plurality of holes are formed across the border between the reflective and transmissive portions. The plurality of holes are located to cover more area of the reflective portion. Therefore, transmittance and color purity of the reflective and transmissive portions are maintained to be a desired value by emitting a white light through the plurality of holes.

More specifically, reflective and transmissive color filter layers 200a and 200b, in FIG. 7, are formed with the same color filter resin and a plurality of holes 202 transmitting light without absorption are formed across the borderline "E''" between reflective and transmissive portions of a lower substrate. Since the reflective color filter layer 200a should have higher transmittance and lower color purity, the extended line "F" defined by connecting the centers of the plurality of holes 202 is disposed at the exterior of the borderline "E''" between the reflective and transmissive portions of the lower substrate for the ideal alignment. A design error of the misalignment may be reduced by selecting a diameter of each hole 202 to be within an attachment error margin. The plurality of holes may be any other shapes including any simple shape in considering the fabricating process.

On the other hand, since a reflective color filter layer should have an area larger than a transmissive color filter layer for higher brightness, a borderline between reflective and transmissive color filter layers is formed at the interior of the borderline between reflective and transmissive portions of the lower substrate.

Figure 8:
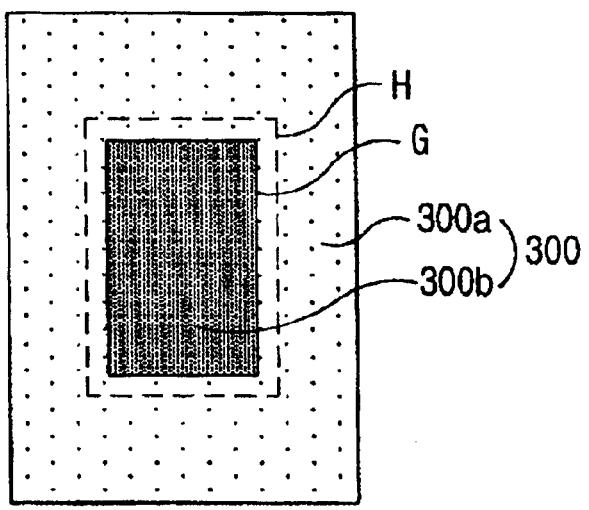
FIG. 8 is a schematic plane view of a color filter layer of a transflective liquid crystal display device according to a third embodiment of the present invention.

FIG. 8 is a schematic plane view of a color filter layer of a transflective liquid crystal device according to a third embodiment of the present invention.

In FIG. 8, the first borderline "G" between reflective and transmissive color filter layers 300a and 300b is disposed at the interior of the second borderline "H" between reflective and transmissive portions. In the third embodiment of the present invention, since an area of the reflective color filter layer 300a increases and an area of the transmissive color filter layer 300b decreases in contrast with the other embodiments, the transmissive color filter layer 300b has lower transmittance and higher color purity. Moreover, a design error of a misalignment may be minimized by selecting a distance between the first and second borderlines "G" and "H" by considering an alignment error margin.

Consequently, in the transflective LCD device according to the present invention, an area ratio of the reflective color filter layer to the transmissive portion and an area ratio of the transmissive color filter layer to the reflective portion are kept constant by disposing the borderline between the reflective and transmissive color filter layers at the interior or exterior of the borderline between the reflective and transmissive portions even when a misalignment occurs. Therefore, transmittance and color purity of the reflective and transmissive portions are maintained to be a desired value, thus a display quality is improved.

It will be apparent to those skilled in the art that various modifications and variations can be made in the transflective liquid crystal display device of the present invention without departing from the spirit or scope of the inventions. Thus, it is intended that the present invention covers the modifications and variations of this invention provided they come within the scope of the appended claims and their equivalents.

What is claimed is:

1. A transflective liquid crystal display device, comprising:

first and second substrates facing into each other;

a pixel electrode on an inner surface of the second substrate, the pixel electrode having a first borderline between reflective and transmissive portions of the pixel electrode;

a transflective color filter layer having reflective and transmissive portions on an inner surface of the first substrate, the transflective color filter layer having a second borderline between the reflective and transmissive portions of the color filter layer, the first and second borderlines being concentric and not aligned in a vertical direction and separated by a distance to be within an attachment error margin, and a transmittance of the transflective color filter layer at the reflective portion of the pixel electrode being higher than that of the transflective color filter layer at the transmissive portion of the pixel electrode;

a common electrode on the transflective color filter layer; and a liquid crystal layer between the pixel electrode and the common electrode.

2. The device according to claim 1, wherein the second borderline has an indented shape.

3. The device according to claim 1, wherein the second borderline has at least one pair of concave and convex portions from the first borderline.

4. The device according to claim 3, wherein the at least one pair of concave and convex portions has one of quadrangle, triangle, circle, and polygonal shape.

5. The device according to claim 1, wherein the distance between the first and second borderlines is in a range of 2 to 50 $\mu$m (micrometers).

6. The device according to claim 1, wherein the transflective color filter layer at the reflective portion of the pixel electrode has a pigment concentration different from the transflective color filter layer at the transmissive portion of the pixel electrode.

7. The device according to claim 1, wherein the transflective color filter layer at the reflective portion of the pixel electrode has a thickness different from that of the transflective color filter layer at the transmissive portion of the pixel electrode.

8. The device according to claim 1, wherein the second borderline is disposed at an inner portion of the first borderline.

9. A transflective liquid crystal display device, comprising:
- first and second substrates facing into each other;
- a pixel electrode on an inner surface of the second substrate, the pixel electrode having a first borderline between reflective and transmissive portions of the pixel electrode;
- a color filter layer having reflective and transmissive portions on an inner surface of the first substrate, the color filter layer having a plurality of light passing regions without filtering light between the reflective and transmissive portions of the color filter layer;
- a common electrode on the color filter layer; and
- a liquid crystal layer between the pixel electrode and the common electrode.

10. The device according to claim 9, wherein the light passing regions are a plurality of portions without a color filter resin.

11. The device according to claim 9, wherein the light passing regions have a symmetrical shape.

12. The device according to claim 9, wherein the light passing regions are formed of a plurality of holes spaced apart from each other, the plurality of holes included in the reflective portion of the color filter layer having an area larger that those included in the transmissive portion of the color filter layer.

13. The device according to claim 12, wherein the plurality of holes have a diameter large enough to be within an alignment error margin.

14. The device according to claim 13, wherein the diameter is in a range of 2 to 50 $\mu$(micrometers).

* * * * *